(12) United States Patent
Uboldi

(10) Patent No.: US 8,075,200 B2
(45) Date of Patent: Dec. 13, 2011

(54) CONNECTING PART FOR AN OPTICAL CONNECTION AND METHOD FOR CONNECTING TWO OPTICAL FIBERS

(75) Inventor: Harry Uboldi, Gordola (CH)

(73) Assignee: Diamond SA, Losone (CH)

( * ) Notice: Subject to any disclaimer, the term of this patent is extended or adjusted under 35 U.S.C. 154(b) by 211 days.

(21) Appl. No.: 12/311,118

(22) PCT Filed: Sep. 7, 2007

(86) PCT No.: PCT/EP2007/059425
§ 371 (c)(1),
(2), (4) Date: Mar. 19, 2009

(87) PCT Pub. No.: WO2008/034727
PCT Pub. Date: Mar. 27, 2008

(65) Prior Publication Data
US 2010/0014811 A1     Jan. 21, 2010

(30) Foreign Application Priority Data
Sep. 20, 2006   (CH) .................................... 1509/06

(51) Int. Cl.
*G02B 6/255*   (2006.01)
*G02B 6/38*    (2006.01)
*G02B 6/00*    (2006.01)
(52) U.S. Cl. ................. 385/99; 385/55; 385/96; 385/98

(58) Field of Classification Search ...................... 385/53, 385/55, 60, 95–99, 137
See application file for complete search history.

(56) References Cited

U.S. PATENT DOCUMENTS

| 4,913,512 A | 4/1990 | Anderton |
| 5,315,682 A | 5/1994 | Daguet et al. |
| 2005/0175291 A1 * | 8/2005 | De Marchi ...................... 385/86 |

FOREIGN PATENT DOCUMENTS

| GB | 2 030 723 A | 4/1980 |
| WO | WO 2004/001471 A1 | 12/2003 |
| WO | WO 2004/001472 A1 | 12/2003 |

* cited by examiner

*Primary Examiner* — Uyen Chau N Le
*Assistant Examiner* — Michael Mooney
(74) *Attorney, Agent, or Firm* — Jerald L. Meyer; Stanley N. Protigal; The Nath Law Group

(57) ABSTRACT

A connecting part (1) for an optical connection of a first optical fiber (2) to a second optical fiber (3) comprises a sleeve-like cable mount (4) having a first cable receiving section (5), in which the first optical fiber (2) can be housed, and a second cable receiving fiber section (6), in which the second optical fiber (3) can be housed. The optical fiber ends (23, 24) of the two optical fibers (2, 3) can be welded together. Therefore, the second cable receiving section (6) is designed along the median longitudinal axis (L) in such a way, that it can be assembled and comprises a casing part (10, 10') pivotable about a hinge (1). The weld joint is located within the pivoting range of the casing part. The cable mount comprises a screw-on coupling sleeve (8) for covering and fixation.

Figure 1:
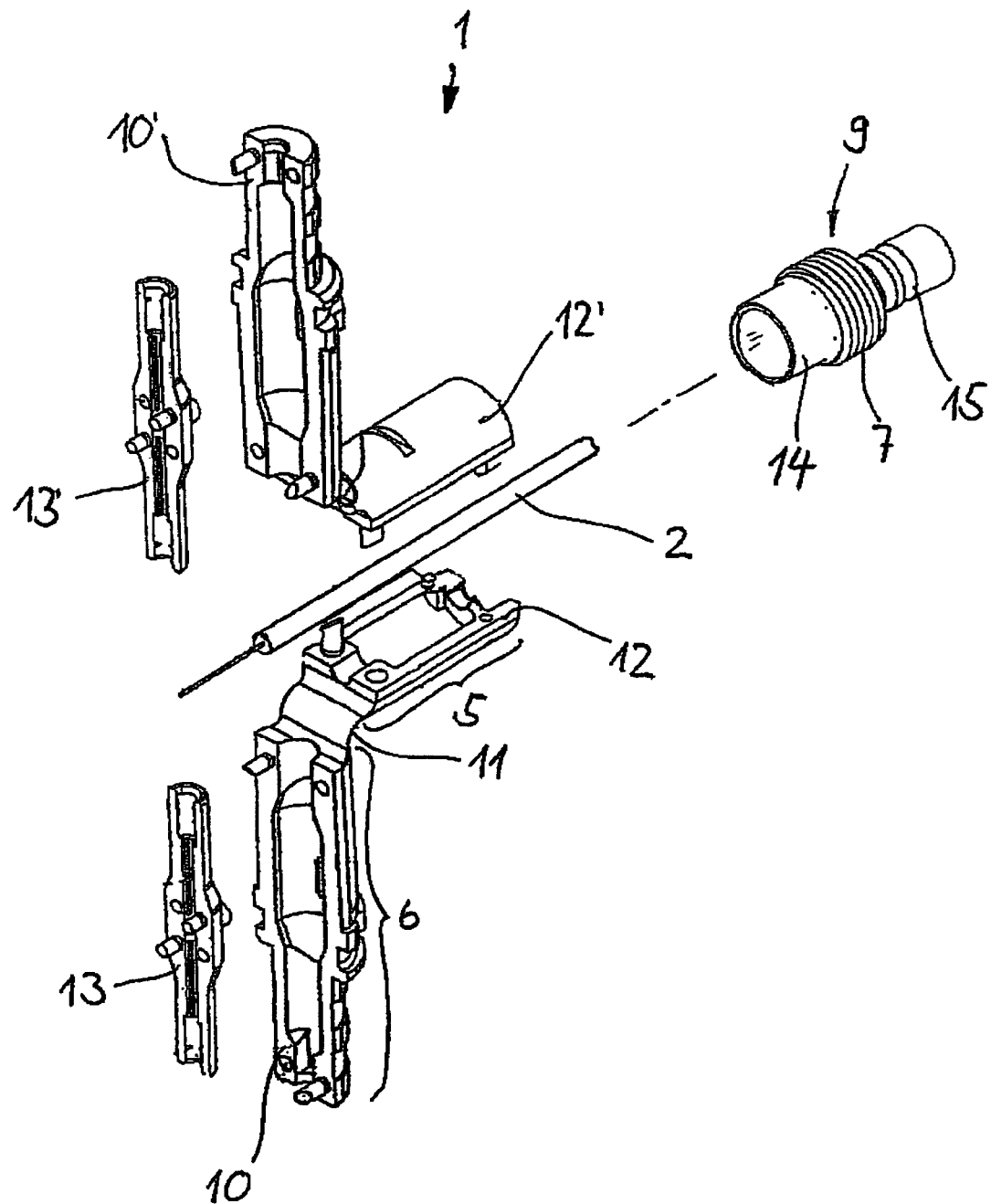

8 Claims, 4 Drawing Sheets

CONNECTING PART FOR AN OPTICAL CONNECTION AND METHOD FOR CONNECTING TWO OPTICAL FIBERS

The invention relates to a connecting part for an optical connection of a first optical waveguide to a second optical waveguide as claimed in the precharacterizing clause of claim 1. The invention also relates to a method for connection of two optical waveguides as claimed in the precharacterizing clause of claim 7. Connecting parts such as these are used in particular for optical waveguide cables which are prefabricated at one end or two ends. Cables such as these are also known to a person skilled in the art by the expressions "pigtail" (one end) and "patch cord" (two ends).

By way of example, from the prior art, WO 2004/001471 has disclosed a plug part for an optical plug connection, whose plug pin is connected after prefitting in the factory to a pin holder. The plug part is completed under in-field conditions, with the optical waveguide of the plug pin being welded to an optical waveguide of an optical waveguide cable. In order to allow this welding, the pin holder has two casing parts which can pivot and in whose pivoting area the weld point can be released. The pin holder is formed in two parts, with each part having an associated casing part, which can pivot. The completed pin holder with the optical waveguides welded to one another is then inserted into a plug housing, which would finally be inserted into a corresponding socket part in order to produce an optical plug connection. Plug connections such as these have the disadvantage that they require a relatively large amount of space. Furthermore, in particular, it has been found that, for example, plug connections are not suitable for repairs to damaged optical waveguide cables. This is because attenuation losses occur in plug connections, in addition to the abovementioned disadvantages.

One object of the invention is therefore to avoid the disadvantages of the known prior art, in particular to provide a connecting part of the type mentioned initially which is particularly suitable for repair purposes. One particular aim is to allow the connecting part to be used for pigtails or patch cords. The connecting part should then be distinguished by cost advantages and ease of handling.

According to the invention, this object is achieved by a connecting part which has the features of claim 1. In contrast to WO 2004/001471, no pin holder that can be assembled in advance is provided, but a cable holder which can be assembled in advance. Instead of a plug pin, one end of an optical waveguide cable, that is to say a first optical waveguide, can be held in a first cable holding section. The attachment of the covering sleeve to the cable holder makes it possible to produce a compact connection between two optical waveguide cables, in an advantageous manner. The elements of the cable holder which are designed such that they can be joined together can be held together in a simple manner with the aid of the covering sleeve. Since the two optical waveguides are only welded to one another, attenuation losses can be avoided.

By way of example, only the second cable holding section may be designed such that it can be joined together. It is, of course, possible to design the cable holder such that it can be joined together overall, in which case, analogously to WO 2004/001471, it may comprise two essentially identical shell parts which can be joined together on a plane running through the longitudinal center axis. Furthermore, it would be feasible to arrange a protective sleeve, which can be split, within the second cable holding section, which it would be possible to close around the weld point. A protective sleeve such as this has been disclosed in WO 2004/001472.

The attachment means for attachment of the covering sleeve to the cable holder may be a screw connection. However, other attachment means, for example snap-action or latching connections, would, of course, also be feasible. A screw connection is an advantageous, detachable connected arrangement, which allows good fixing.

For a particularly advantageous screw connection, an external thread for the screw connection to the covering sleeve can be provided in the area of the cable-side end of the first cable holding section.

The external thread may be arranged on a crimp part, which is arranged at the cable-side end of the cable holder and is composed of metal. A crimp part such as this can form an advantageous termination of the cable holder. The cable holder itself may be composed of a plastic. The covering sleeve, like the cable holder, may be composed of a plastic or, like the crimp part, may be composed of a metal.

The covering sleeve may be in the form of a hollow-cylindrical component, on whose inside an internal thread is arranged, which corresponds to the external thread. The covering sleeve may have an insertion side via which the covering sleeve can be fitted to the second cable holding section. A preferably circumferential collar which points inwards can be arranged on the side of the covering sleeve opposite the insertion side, and forms a stop. This stop interacts in the limit position with a corresponding shoulder on the cable holder, and thus fixes the limit position after the covering sleeve has been screwed on completely.

In a further embodiment, the second cable holding section may have at least one casing part which can be pivoted on a joint through a specific pivoting angle between an open position and a closed position. In this case, the weld point may be located in the pivoting area of the casing part. However, it is advantageous in this case to provide two casing parts which can pivot and can be joined together. When the casing parts are pivoted out, the two optical waveguides can be welded to one another in a particularly simple manner.

It could be particularly advantageous for the first cable holding section to be formed integrally. In this case, the second cable holding section may comprise two casing parts which are each connected via a joint to the first cable holding section. The small number of components for the connecting part results in advantageous handling.

The invention also relates to a method for connection of two optical waveguides, which has the features in claim 9.

Figure 2:
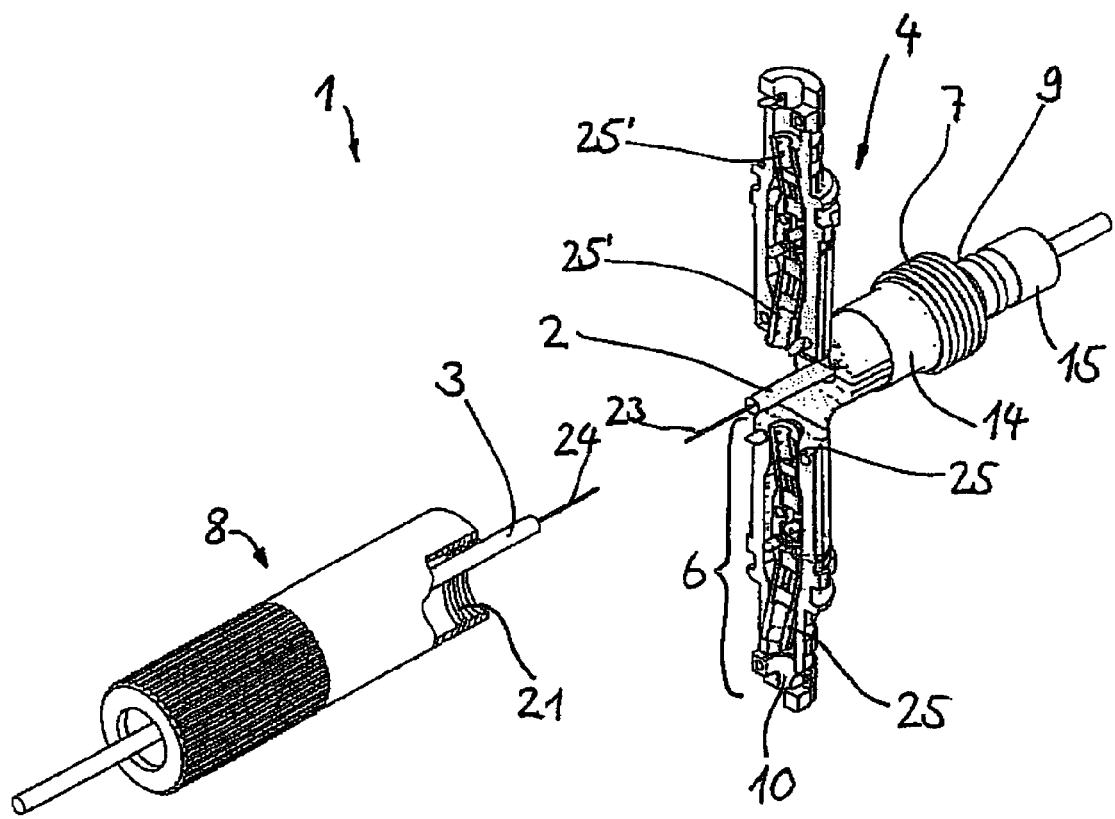
Figure 3:
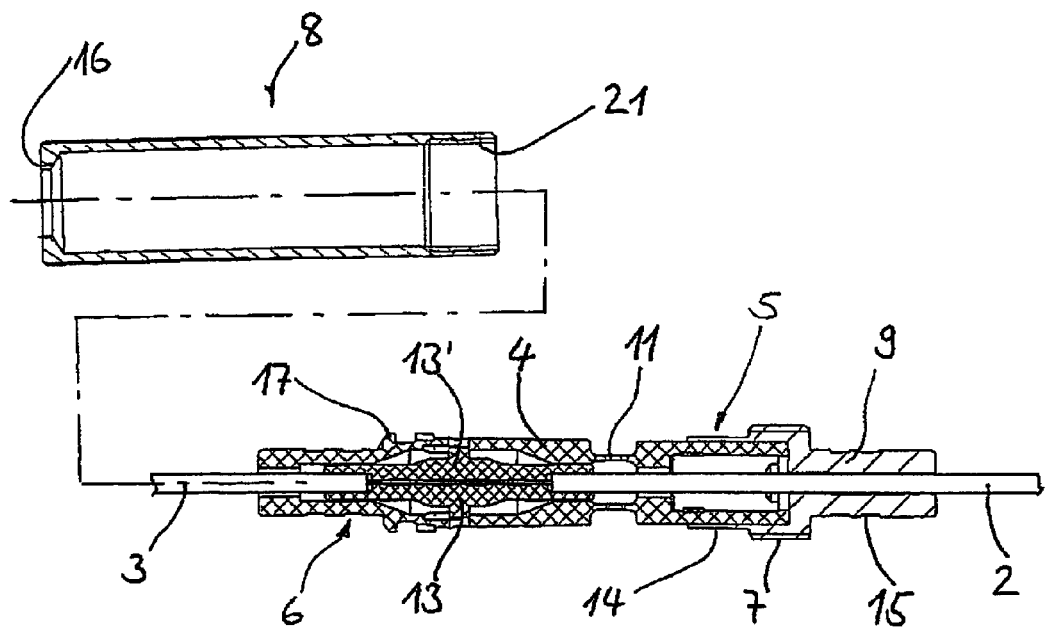
Figure 4:
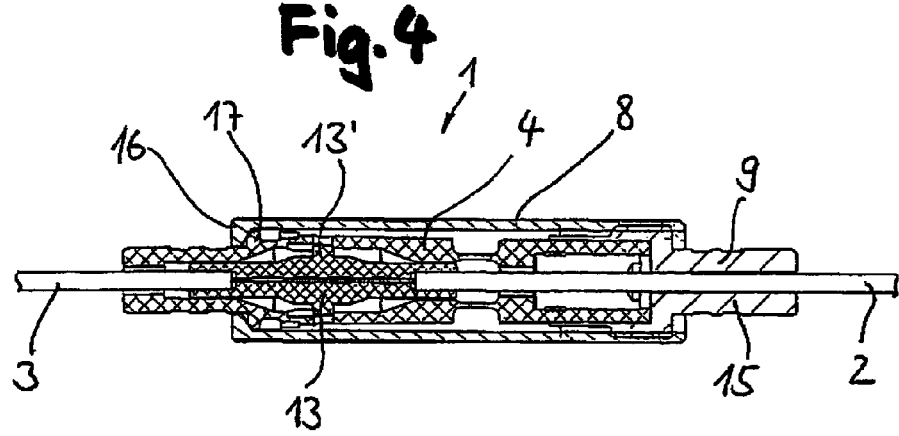
Figure 5:
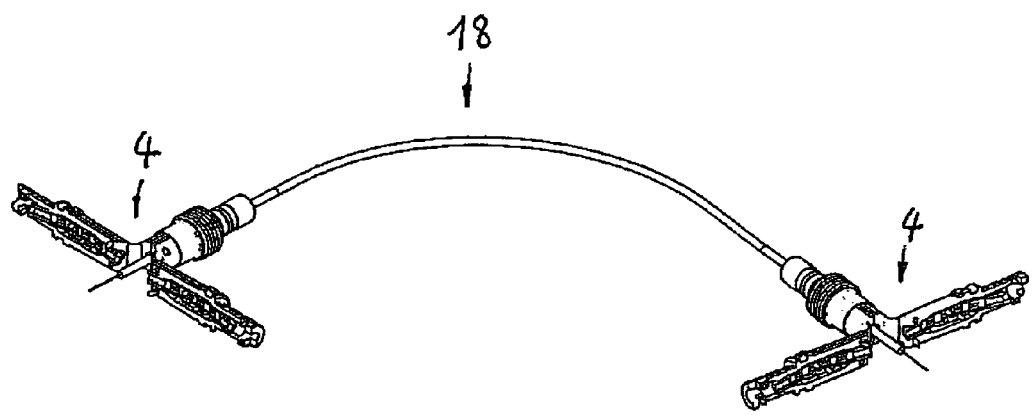
Figure 6:
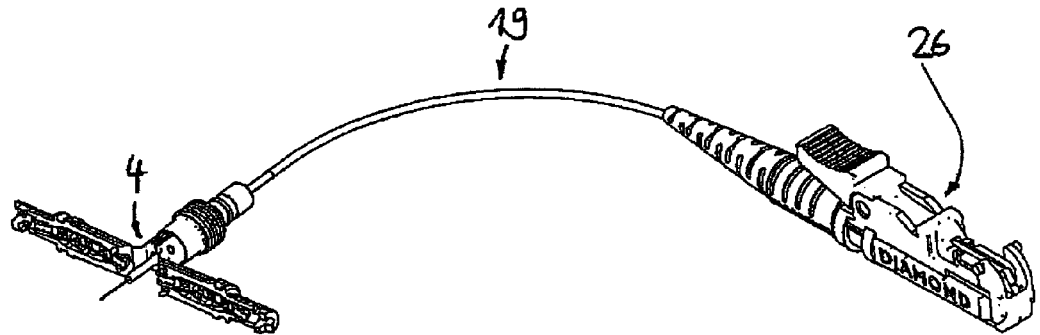

Further detailed features and advantages of the invention will become evident from the exemplary embodiment described in the following text and from the drawings, in which:

FIG. 1 shows a perspective exploded illustration of a connecting part according to the invention, FIG. 2 shows a perspective illustration of a connecting part with a prefitted cable holder and a covering sleeve, FIG. 3 shows a cross section through a connection of two optical waveguides with the connecting part as shown in FIG. 2, before the covering sleeve is fitted, FIG. 4 shows a cross section through the connection of two optical waveguides with the connecting part as shown in FIG. 2, with the covering sleeve fitted, FIG. 5 shows a cable arrangement (patch cord cable) which is provided with cable holders at two ends, and FIG. 6 shows a cable arrangement (pigtail cable) which is provided with the cable holder as shown in FIG. 2 at one end.

FIG. 1 shows the individual components of a connecting part, which is annotated 1 in its totality. The connecting part 1 essentially comprises a cable holder 4 in which, in the preassembled state, the first optical waveguide, which is annotated 2, is held, and a covering sleeve 8. The cable holder comprises two shell parts which are designed such that they can be joined together along the longitudinal axis L. Each shell part comprises a casing part 10 or 10', which can be pivoted out, and a casing part 12 or 12', which is connected thereto via a film hinge 11. Furthermore, a crimp part 9 can be seen, by means of which the shell parts can be held together (cf. the following FIG. 2). A protective sleeve, which can be split and has protective sleeve parts 13 and 13', is arranged in the respective casing part 10 or 10' within the cable holding section 6, and can once again be closed. The first cable holding section 5 could, of course, be formed integrally.

The basic design of the cable holder 4 corresponds analogously to the design of the pin holder as is described in WO 2004/001472. In addition to having a different purpose, however, the present cable holder differs from this in that an additional part (i.e. crimp sleeve 9) is provided in order to hold the shell parts together. With regard to further design details, reference is therefore made to WO 2004/001472, which is hereby expressly included as part of the disclosure of this application. This embodiment of the cable holder 1 as shown in FIG. 1 is virtually identical to the pin holder shown in FIG. 1 of WO 2004/001472. If need be, it would, of course, be possible to dispense with the protective sleeve 13, 13', as has been disclosed, for example, in WO 2004/001471.

As can be seen from FIG. 2, a preassembled cable holder and a covering sleeve 8, which will be described in more detail in the following text, are advantageously used in practice in order to produce an optical connection in order to connect two optical waveguides. The respective optical waveguides 2 and 3 have bare optical waveguide ends 23 and 24, which can be connected to one another by means of a welding process. As can be seen, the two shell parts are held together by the crimp part 9 in the area of the casing parts 12 and 12'. The casing parts, which are fixed to one another by the crimp part 9, define a first cable holding section 5, in which the first optical waveguide 2 is held. The casing parts 10 and 10' provide a second cable holding section 6, in which the second optical waveguide 3 can be held.

The covering sleeve 8 can be fitted to the cable holder 4 from the second cable holding section 6, and can be attached to the cable holder, in order to cover it (cf. FIG. 3). For this purpose, an external thread 7 is provided on the first cable holding section 5. In a corresponding manner, a corresponding internal thread 21 is arranged on the inside of the covering sleeve. The cable holder can be advantageously covered and secured by the covering sleeve being screwed onto the cable holder.

The crimp part 9 has an external threaded section for the external thread 7, which is located between a crimp section 14 for crimping the crimp part to the casing part 12, 12', and an end section 15. The end section 15 forms the cable-side end of the cable holder 4 for the optical waveguide 2. A virtually permanent connection can be produced in a particularly advantageous manner by crimping the crimp part 9 to the cable holder. It will, of course, also be feasible to dispense with a metallic crimp part and, for example, to provide an external thread directly on the casing part 12 or 12'.

FIG. 2 shows the connecting part 1 slightly modified from FIG. 1. The major difference from the exemplary embodiment shown in FIG. 1 is, in particular, a different configuration of the protective sleeve part 13 or 13'. As can clearly be seen from FIG. 2, the protective sleeve parts 13 and 13', which are inserted into corresponding receptacles by means of plug-in heads, each have side sections 25 and 25', respectively, which are angled inwards on both sides. This results in an advantageous clamping effect being exerted on the optical waveguide when the protective sleeve is closed.

FIG. 3 shows the bare conductor ends welded to one another and the casing parts 10 of the cable holder 4 pivoted to the closed position. The covering sleeve 8 can be fitted from the second cable holding section, in order to cover the cable holder. The external thread 7 is provided in the area of the cable-side end of the first cable holding section 5, for attachment to the cable holder 4.

FIG. 4 shows a completed optical connection between the optical waveguide cables 2 and 3. As can be seen, in this case, the screwed-on covering sleeve 8 is located in a final position. This final position is defined by a shoulder 16, pointing inwards, at the cable-side end of the covering sleeve. This shoulder 16 interacts with a corresponding edge 17 of the casing part 10 and 10', which forms a stop for the shoulder.

FIGS. 5 and 6 show preferred exemplary embodiments of the connecting part described above. FIG. 6 relates to a so-called pigtail, that is to say a pigtail cable 19 which is provided with the cable holder 4 at one end, and which is equipped at the other end with a plug part 26, for example a plug part of the F-3000™ type or else the E-2000™ etc. type. FIG. 5 relates to a patch cord cable 18, which is provided with a cable holder 4 at both ends.

The invention claimed is:

1. A connecting part for an optical connection of a first optical waveguide to a second optical waveguide comprising:
a sleeve-like cable holder containing a first cable holding section in which the first optical waveguide is capable of being held; and
a second cable holding section in which the second optical waveguide is capable of being held, wherein the optical waveguide ends of the two optical waveguides are weldable to one another, with at least the second cable holding section being designed such that it is joinable together along the longitudinal center axis, wherein the second cable holding section has at least one casing part which is pivotable on a joint through a specific pivoting angle between an open position and a closed position, wherein attachment means are provided on the first cable holding section with aid of a covering sleeve, which is capable of being fitted from the second cable holding section, and is attachable to said attachment means in order to cover the cable holder.

2. The connecting part according to claim 1, wherein the attachment means for attachment of the covering sleeve to the cable holder is a screw connection.

3. The connecting part according to claim 1, wherein an external thread for a screw connection to the covering sleeve is provided in the area of the cable-side end of the first cable holding section.

4. The connecting part according to claim 3, wherein the external thread is provided on a crimp part, which is arranged at the cable-side end of the cable holder and is composed of metal.

5. The connecting part according to claim 1, wherein the first cable holding section is formed integrally, and the second cable holding section comprises two casing parts which are each connected via a joint to the first cable holding section.

6. A cable arrangement having a cable containing an optical waveguide, whose at least one end is formed by a connecting part as claimed in claim 1.

7. A method for connection of two optical waveguides by means of a connecting part having a sleeve-like cable holder which is designed at least in places such that it is joinable together along a longitudinal center axis and has two pivoting casing parts, comprising:

provviding the pivoting casing parts in an open position;

inserting a bare conductor end of a first optical waveguide and an opposite bare conductor end of a second optical waveguide into the cable holder;

welding the bare conductor ends to one another, with the weld point being located in the pivoting area of the casing parts;

pivoting the casing parts about a pivot joint to a closed position, thereby joining the casing parts; and fitting a covering sleeve in order to cover the cable holder and to secure the casing parts to the closed position such that the covering sleeve covers the pivoted casing parts and pivot joint.

8. A cable arrangement according to claim 6, wherein said cable arrangement is a pigtail whose one end is formed by said connecting part and whose second end comprises a plug connector, or a patchcord whose both ends are formed each by one of said connecting parts.

* * * * *